United States Patent
Tanaka et al.

(10) Patent No.: US 9,537,139 B2
(45) Date of Patent: Jan. 3, 2017

(54) NEGATIVE ELECTRODE FOR NON-AQUEOUS SECONDARY BATTERY, AND A NON-AQUEOUS SECONDARY BATTERY

(75) Inventors: Naokage Tanaka, Hitachi (JP); Akira Inaba, Osaka (JP); Keiichiro Uenae, Kyoto (JP); Masayuki Yamada, Kyoto (JP); Kazunobu Matsumoto, Mishima-gun (JP)

(73) Assignee: HITACHI MAXELL LTD., Osaka (JP)

( * ) Notice: Subject to any disclaimer, the term of this patent is extended or adjusted under 35 U.S.C. 154(b) by 516 days.

(21) Appl. No.: 13/814,069

(22) PCT Filed: Aug. 3, 2011

(86) PCT No.: PCT/JP2011/067731
§ 371 (c)(1),
(2), (4) Date: Feb. 4, 2013

(87) PCT Pub. No.: WO2012/018035
PCT Pub. Date: Feb. 9, 2012

(65) Prior Publication Data
US 2013/0136988 A1 May 30, 2013

(30) Foreign Application Priority Data
Aug. 3, 2010 (JP) .................................. 2010-174270

(51) Int. Cl.
| | | |
|---|---|---|
| H01M 4/131 | (2010.01) | |
| H01M 4/133 | (2010.01) | |
| H01M 4/134 | (2010.01) | |
| H01M 4/36 | (2006.01) | |
| H01M 4/38 | (2006.01) | |
| H01M 4/485 | (2010.01) | |
| H01M 4/587 | (2010.01) | |
| H01M 4/525 | (2010.01) | |
| H01M 10/052 | (2010.01) | |

(52) U.S. Cl.
CPC ............ *H01M 4/131* (2013.01); *H01M 4/133* (2013.01); *H01M 4/134* (2013.01); *H01M 4/364* (2013.01); *H01M 4/38* (2013.01); *H01M 4/485* (2013.01); *H01M 4/525* (2013.01); *H01M 4/587* (2013.01); *H01M 10/052* (2013.01); *Y02E 60/122* (2013.01)

(58) Field of Classification Search
CPC .... H01M 4/131; H01M 4/133; H01M 4/1315; H01M 4/134
USPC ......... 429/220, 231.8, 231.1, 221, 224, 223, 429/229, 231.5, 231.6
See application file for complete search history.

(56) References Cited

U.S. PATENT DOCUMENTS

| | | | |
|---|---|---|---|
| 2004/0115535 A1* | 6/2004 | Morita et al. | ............... 429/231.8 |
| 2008/0193831 A1* | 8/2008 | Mah | ....................... C01B 33/113 429/122 |
| 2009/0162750 A1 | 6/2009 | Kawakami et al. | |
| 2010/0075227 A1 | 3/2010 | Morita et al. | |
| 2010/0143802 A1* | 6/2010 | Takei | ............................ 429/223 |
| 2011/0262796 A1* | 10/2011 | Shimooka et al. | ........... 429/144 |

FOREIGN PATENT DOCUMENTS

| | | |
|---|---|---|
| CN | 101752547 A | 6/2010 |
| JP | 2003-17051 A | 1/2003 |
| JP | 2004-47404 A | 2/2004 |
| JP | 2004-119176 A | 4/2004 |
| JP | 2005-259697 A | 9/2005 |
| JP | 2007-329001 A | 12/2007 |
| JP | 2008-210618 A | 9/2008 |
| JP | 2009-181767 A | 8/2009 |
| JP | 2010-73651 A | 4/2010 |
| WO | 2009/031715 A1 | 3/2009 |

OTHER PUBLICATIONS

International Search Report for PCT/JP2011/067731, mailing date of Oct. 25, 2011.

* cited by examiner

*Primary Examiner* — Emily Le
*Assistant Examiner* — Monique Wills
(74) *Attorney, Agent, or Firm* — Westerman, Hattori, Daniels & Adrian, LLP

(57) ABSTRACT

[Objectives] The present invention provides a non-aqueous secondary battery in which a material containing Si and O as constituent elements is used in a negative electrode. The present invention provides a non-aqueous secondary battery having good charge discharge cycle characteristics, and suppressing the battery swelling associated with the charge and the discharge. Also, the present invention relates to a negative electrode that can provide the non-aqueous secondary battery. [Solution] The negative electrode includes a negative electrode active material, including a composite of a material containing Si and O as constitution elements (atom ratio x of O to Si is $0.5 \leq x \leq 1.5$) in combination with a carbon material, and graphite. The graphite has an average particle diameter dg (μm) of 4 to 20 μm. The material containing Si and O as constitution elements has an average particle diameter ds (μm) of 1 μm or more. The ratio ds/dg (i.e., ds to dg) is 0.05 to 1. The material containing Si and O as constitution elements has a crystallite diameter of 50 nm or less, the crystallite diameter is calculated from a half width at a (220) plane of Si obtained by an X-ray diffraction method, using Scherrer Formula. In 100 mass % of the composite of the material containing Si and O as constitution elements, and the carbon material, a ratio of the material containing Si and O as constitution elements is 70 to 95 mass %.

4 Claims, No Drawings

NEGATIVE ELECTRODE FOR NON-AQUEOUS SECONDARY BATTERY, AND A NON-AQUEOUS SECONDARY BATTERY

TECHNICAL FIELD

The present invention relates to a non-aqueous secondary battery having good charge discharge cycle characteristics, and suppressing the battery swelling associated with the charge and the discharge. Also, the present invention relates to a negative electrode that can provide such a non-aqueous secondary battery.

BACKGROUND OF THE INVENTION

A non-aqueous secondary battery such as a lithium-ion secondary battery is known as having a high voltage and a high capacity. From these reasons, it is widely adopted as a power source of various portable equipments. In addition, recent years have been spreading into medium-scale or large-scale size applications, including power tools such as electric power tools, and electric vehicles and electric bicycles.

Especially, it is used in cellular phones or game machines that have advanced its development in miniaturization and multifunction. The batteries in such applications are further demanded to increase their capacity. One approach is in the research and development to focus on the electrode active materials exhibiting a high charge discharge capacity. Among other things, a focus has been made on a material that allows more absorption and desorption of lithium (ions), such as silicon (Si) and tin (Sn) as a negative electrode active material, instead of a carbonaceous material such as graphite which is adopted in conventional non-aqueous secondary batteries. In particular, $SiO_x$ was reported to have showed excellent load characteristics in a structure of ultrafine Si particles dispersed in the $SiO_2$. See Patent Publications Nos. 1 and 2.

However, $SiO_x$ exhibits large volumetric expansion and shrinkage associated with the charge and the discharge reaction. Therefore, the particles can be crushed during each cycle of the charge and the discharge of the battery. As a result, it is known that exposed surfaces of Si can react with the solvent of the non-aqueous electrolyte, causing the problems that increase an irreversible capacity or brings about the battery swelling due to the charge and the discharge. Also, $SiO_x$ has a fine shape, so that it can attain a certain level of improvements in the load characteristic of the battery. It is, however, noted that $SiO_x$ per se is a material having a low conductivity. Therefore, there is still a room to make further improvements.

Under the circumstances as explained above, it was proposed to restrict the use rate of $SiO_x$ to suppress the volumetric expansion and shrinkage associated with the charge and the discharge reactions. It was also proposed to coat the $SiO_x$ surfaces with a conductive material such as carbon to improve the load characteristics. It was also proposed to use a non-aqueous electrolyte including a halogen-substituted cyclic carbonate (e.g., 4-fluoro-1,3-dioxolane-2-one). Using these technical proposals, the batteries have been proposed to improve the charge discharge cycle characteristics thereof. See Patent Document No. 3.

PRIOR ART DOCUMENT

Patent Documents

Patent document 1: Japanese Patent Publication No. 2004-047404
Patent document 2: Japanese Patent Publication No. 2005-259697
Patent document 3: Japanese Patent Publication No. 2008-210618

SUMMARY OF THE INVENTION

Objectives to be Resolved by the Invention

Using a material containing Si and O as constitution elements for the negative electrode, the present invention provides technology that is different from the disclosure in e.g., Patent Document 3. Thus, the objectives of the present invention are to provide a non-aqueous secondary battery having good charge discharge cycle characteristics, and to suppress the battery swelling associated with the charge and the discharge. Another objective is to provide a negative electrode to produce such a non-aqueous secondary battery.

Means to Solve the Objectives

There is provided a negative electrode for non-aqueous secondary battery including a negative electrode active material. The negative electrode active material includes: a composite of a material containing Si and O as constitution elements (atom ratio x of O to Si is 0.5≤x≤1.5) in combination with a carbon material; and graphite. The graphite has an average particle diameter dg (μm) of 4 to 20 μm. The material containing Si and O as constitution elements has an average particle diameter ds (μm) of 1 μm or more. A ratio ds/dg (i.e., ds to dg) is 0.05 to 1. The material containing Si and O as constitution elements has a crystallite diameter of 50 nm or less. Here, the crystallite diameter is calculated from a half width at a (220) plane of Si obtained by an X-ray diffraction method, using the Scherrer Formula. In 100 mass % of the composite of the material containing Si and O as constitution elements, and the carbon material, a ratio of the material containing Si and O as constitution elements is 70 to 95 mass %.

There is also provided a non-aqueous secondary battery including: a positive electrode comprising a Li-containing transition metal oxide; a negative electrode, and a non-aqueous electrolyte. The negative electrode is the negative electrode for the non-aqueous secondary battery.

Effects of the Invention

According to the present invention, a material containing Si and O as constitution elements is used as a negative electrode. As a result, a non-aqueous secondary battery can be provided with excellent charge discharge cycle characteristics, as well as suppress the battery swelling associated with the charge and the discharge. Also, a negative electrode can be provided to construct such a non-aqueous secondary battery.

DESCRIPTION OF THE INVENTION

The negative electrode for the non-aqueous secondary battery of the present invention can be provided with a structure as follows. For example, a negative electrode mixture layer contains a negative electrode active material and a binder. The negative electrode mixture layer is formed on one side or both sides of a current collector. Here, the negative electrode active material includes: a composite of $SiO_x$ and carbon material; and graphite.

$SiO_x$ can contain Si fine crystals or Si amorphous phases. In this case, the atom ratio of Si and O should be considered including the Si atoms in the Si fine crystals and the Si amorphous phases. In other words, $SiO_x$ can include a structure in which Si (e.g., Si fine crystals) has dispersed in a matrix of amorphous $SiO_2$. Namely, considering the total of the amorphous $SiO_2$ and dispersing Si therein, the entire of the material can satisfy the atom ratio x being $0.5 \leq x \leq 1.5$. For example, assume that a structure includes Si having dispersed in a matrix of amorphous $SiO_2$ in which the molar ratio of $SiO_2$ and Si is 1:1. In this case, since it is x=1, it is expressed as SiO in a general formula. In such a structure of the material, a peak derived from the existence of Si (i.e., fine crystals of Si) might not be observed in an X-ray diffraction analysis. However, observation with a transmission electron microscope can confirm the existence of Si fine crystals.

The following problems can be found when the Si crystallite diameter in $SiO_x$ is too large. Namely, as repeating the charge and the discharge of the battery, the matrix ($SiO_2$) around the Si particles are cracked under the stresses caused by the expansion and the shrinkage. As a result, the charge discharge cycle characteristics of the battery can be decreased. Here, the $SiO_x$ crystallite diameter can be calculated by using the Scherrer Formula from the half width at a (220) plane of Si obtained by an X-ray diffraction method. In the present invention, the $SiO_x$ crystallite diameter can be particularly 50 nm or less, and more particularly, 40 nm or less, and yet in particular, 20 nm or less.

It is, however, noted that $SiO_x$ with small Si crystallite diameter cannot be easily prepared. Therefore, the $SiO_x$ crystallite diameter can be particularly 1 nm or more, and more particularly, 2 nm or more, that is obtained through the Scherrer Formula from the half width at a (220) plane of Si obtained by an X-ray diffraction method.

In the specification of the present application, the half width at a (220) plane of Si in $SiO_x$ can be obtained as follows. Using an X ray with a wavelength of Cu-Kα, a diffraction pattern is measured at a condition of a tube current of 300 mA, a tube voltage of 50 kV, and a scanning speed of 2°/minute. Then, a half width can be obtained from the peak appearing at a diffraction angle of $2\theta = 47.2°$. Where the Si peak at the (220) plane overlaps with the peaks of other substances contained in the active material, the peaks are divided to calculate the half width of the target.

The Si crystallite diameter in $SiO_x$ can be controlled by heat treatment. For example, the heat treatment can be applied to maintain $SiO_x$ at 800° C. or more but less than the melting point thereof in an inert gas atmosphere for 3 to 10 hours. The inert gas can be a rare gas such He, Ar, and Ne. At a temperature of 1350° C. or less, $N_2$ gas can be used.

The $SiO_x$ used in the negative electrode of the present invention is a composite with a carbon material. For example, the surfaces of the $SiO_x$ can be coated with a carbon material. As explained before, $SiO_x$ has a poor conductivity. Therefore, when using it as a negative electrode active material, the followings can be considered in view of securing good battery characteristics. A conductive material (i.e., conductive assistant) is used. Also, the improvement in mixing or dispersing the $SiO_x$ and the conductive material are made in the negative electrode, so that an excellent conductive network can be formed. In these respects, use of the composite of $SiO_x$ and carbon material can attain better conductive network formation in the negative electrode than a material obtained by merely mixing $SiO_x$ and carbon material.

The examples of the composite of $SiO_x$ and carbon material can include: one in which the surfaces of $SiO_x$ are coated with a carbon material (which is hereinafter referred to as "carbon material (A)"); and granules of $SiO_x$ and a carbon material (which is hereinafter referred to as "carbon material (B)").

Also, the composite having the $SiO_x$ surfaces coated with carbon material (A) can be modified into another composite with another conductive material (e.g., carbon material, which is hereinafter referred to as "carbon material (B)"). As a result, more advantageous conductive network can be formed in the negative electrode, thereby attaining a non-aqueous secondary battery with a higher capacity and more excellence regarding the battery characteristics (e.g., charge discharge cycle characteristics). The following is an example of such a modified composite including another carbon material (B) in combination with the composite of $SiO_x$ coated with carbon material (A). Namely, such an example can be granules obtained by granulating a mixture of the composite of $SiO_x$ coated with carbon material (A) in combination with another carbon material (B).

As the $SiO_x$ material whose surface is coated with carbon material (A), the following composite can be also used. Such a composite has a surface of a composite of $SiO_x$ and carbon material composite (B) (e.g., granules; the carbon material (B) having a smaller specific resistance than the $SiO_x$ material) coated with carbon material (A). Namely, as a $SiO_x$ coated with the carbon material (A), $SiO_x$ alone or a composite of $SiO_x$ with fibrous carbon or graphite particles can be used. When the $SiO_x$ material and the carbon material are dispersed within the granules, more advantageous conductive network can be formed. Therefore, a non-aqueous secondary battery can be further improved by using the negative electrode containing the $SiO_x$ material as a negative electrode active material, in view of the battery characteristics such as heavy load discharge characteristics. It can be noted that the carbon material (A) and the carbon material (B) can have the same physical properties.

The examples of the carbon material used to form a composite with the Si material can include low crystalline carbon, carbon nanotube, and vapor-grown carbon fiber.

In more detail, the carbon material can be at least one material selected from the group as follows: a fibrous or coil-shaped carbon material, carbon black (including acetylene black and ketjen black), artificial graphite, easily graphitizable carbon, and hardly graphitizable carbon. A fibrous or coil-shaped carbon material can be used because it facilitates the formation of a conductive network and has a large surface area. Carbon black (including acetylene black and ketjen black), easily graphitizable carbon and hardly graphitizable carbon can be used because they have a high electrical conductivity and a high liquid-holding ability, and moreover they have the property to readily maintain contact with the $SiO_x$ particles even when the particles expand and/or shrink.

The graphite can be used along with the $SiO_x$ as a negative electrode active material, and such graphite can be used as a carbon material for the composite of $SiO_x$ and the carbon material. Like carbon black, graphite also has a high electrical conductivity and a liquid-retention ability, and moreover it has the property to readily maintain contact with the particles of the Si material even when the particles expand and/or shrink. Thus, it can be particularly used to form a composite with the Si material.

Among the carbon materials described above, fibrous carbon material can be used to form a composite with the $SiO_x$ material in the form of granules. Since a fibrous carbon material has a thin thready shape and is highly flexible, it can respond to the expansion and/or the shrinkage of the Si material associated with the charge and the discharge of the battery. Also, the fibrous carbon material has a large bulk density, so that it can have many contacts with the $SiO_x$ material particles. The examples of the fibrous carbon material can include polyacrylonitrile (PAN) carbon fiber, pitch carbon fiber, vapor-grown carbon fiber, and carbon nanotube, and any of these materials can be used.

It is also noted that the fibrous carbon material can be formed on the surface of the $SiO_x$ material particles by means of, e.g., vapor phase method.

$SiO_x$ generally has a specific resistance of $10^3$ to $10^7$ kΩm, whereas the carbon materials described above can have a specific resistance of $10^{-5}$ to 10 kΩm.

Further, the composite of $SiO_x$ and carbon material can be further provided with a material layer (i.e., material layer containing hardly graphitizable carbon) covering the carbon material coating layer on the particle surfaces.

The composite of $SiO_x$ and carbon material can have the following features. Namely, in view of excellently showing the effects by using the composite with a carbon material, the ratio of the $SiO_x$ to the carbon material can be particularly 95 mass % or less, and in particular, 90 mass % or less, in 100 mass % of the composite of $SiO_x$ and carbon material. Namely, when the composite of $SiO_x$ and carbon material has a configuration in which the surfaces of $SiO_x$ are coated with a carbon material, the excessively small amount of the carbon material can result in insufficient coating of the $SiO_x$ surfaces. In this case, the effects to improve a conductivity by using the composite of $SiO_x$ and carbon material might be insufficient.

However, when the composite of $SiO_x$ and carbon material has an excessively low content of $SiO_x$, this can resultantly produce negative electrode mixture layer having decreased amount of $SiO_x$. In such a case, the effects to increase the capacity can be deteriorated. Therefore, in 100 mass % of the composite of $SiO_x$ and carbon material, the ratio of $SiO_x$ can be particularly 70 mass % or more, and more particularly 80 mass % or more.

For example, the composite of Si and carbon material can be obtained as follows.

First, a method for producing a composite of the $SiO_x$ material is described. A dispersion liquid is prepared in which the $SiO_x$ material is dispersed in a dispersion medium. Then, the dispersion liquid is sprayed and dried to produce composite particles composed of a plurality of particles. For example, ethanol can be used as the dispersion medium. It can be suitable to spray the dispersion liquid in e.g., an atmosphere at 50 to 300° C. Other than the method described here, a mechanical granulation method using a vibration or planetary ball mill or a rod mill can be used to obtain the composite particles in a similar way.

When granules are produced from $SiO_x$ material and carbon material having a smaller specific resistance than the $SiO_x$ material, the carbon material is added to a dispersion liquid of the $SiO_x$ material dispersed in a dispersion medium. Using this dispersion liquid, the composite particles (i.e., granules) can be produced in the same way as combining the $SiO_x$ materials. Also, the granules of $SiO_x$ material and carbon material can be produced by the mechanical granulation method in the same manner as described before.

Next, when producing a composite by coating the surfaces of $SiO_x$ material particles (i.e., $SiO_x$ composite particles, or $SiO_x$ material-carbon material granules) with a carbon material, the $SiO_x$ material particles and hydrocarbon gas are heated in a vapor phase to deposit carbon generated by thermal decomposition of the hydrocarbon gas on the surfaces of the particles. In this way, the hydrocarbon gas can be distributed throughout the composite particles by chemical-vapor deposition (CVD), so that a thin, uniform coating containing the conductive carbon material (i.e., carbon material coating layer) can be formed on the surface of the particles and in the holes on its surfaces. Thus, the conductivity can be uniformly imparted to the $SiO_x$ material particles with a small amount of the carbon material.

The treatment temperature (i.e., atmospheric temperature) of the chemical-vapor deposition (CVD) can be changed depending on the kind of hydrocarbon gas used, but 600 to 1200° C. can be suitable. In particular, the treatment temperature can be 700° C. or more, and more in particular, 800° C. or more. As a result, a higher treatment temperature produces less residual impurities, thereby forming a coating layer with highly conductive carbon.

While toluene, benzene, xylene, mesitylene or the like can be used as a liquid source of the hydrocarbon gas, toluene can be particularly used because it is easy to handle. The hydrocarbon gas can be obtained by evaporating (e.g., bubbling with nitrogen gas) any of these kinds of the liquid source. It is also possible to use methane gas, acetylene gas, and the like.

After coating the surface of the $SiO_x$ material particles (i.e., $SiO_x$ composite particles, or the $SiO_x$ material-carbon material granules) with the carbon material by chemical-vapor deposition (CVD), at least one organic compound, selected from petroleum pitch, coal pitch, thermosetting resin, and a condensation product of naphthalene sulfonate and aldehydes, is adhered to the coating layer containing the carbon material. Then, the particles with the organic compound adhered to can be fired.

In detail, prepared can be a dispersion liquid in which an organic compound and $SiO_x$ material particles having coated with carbon material ($SiO_x$ composite particles, or the $SiO_x$ material-carbon material granules) are dispersed in a dispersion medium. Then, the dispersion liquid is sprayed and dried to form particles having coated with the organic compound. Then, the particles having coated with the organic compound are fired.

The pitch can be an isotropic pitch. The thermosetting resin can be phenol resin, furan resin, furfural resin or the like. The condensation product of naphthalene sulfonate and aldehydes can be a naphthalene sulfonate-formaldehyde condensation product.

The dispersion medium can be water or alcohols (e.g., ethanol) for dispersing the organic compound and the $SiO_x$ material particles having its surface coated with the carbon material. The dispersion liquid can be usually sprayed in an atmosphere at a temperature of 50 to 300° C. The appropriate temperature of the firing can be 600 to 1200° C. Among the range above, it can be suitable at 700° C. or more, and in particular at 800° C. or more. A higher treatment temperature can produce less residual impurities, thereby forming a coating layer containing excellent carbon material with a high conductivity. However, the treatment temperature can be required to be lower than or equal to the melting point of the $SiO_x$ material.

The examples of the graphite carbon material used as a negative electrode active material along with the $SiO_x$ material-carbon material composite include: natural graphite such as scaly graphite; and artificial graphite obtained by graphitizing easily graphitizable carbons, such as pyrolytic carbons, mesocarbon microbeads (MCMB) and carbon fiber, at 2800° C. or more.

When the graphite with a particle diameter being too small is used as a negative electrode active material, the specific surface area of the graphite can be increased. As a result, there might be in a situation that the components in the non-aqueous electrolyte can form a film on the surface of the negative electrode in the battery. As a result, the battery irreversible capacity can be increased. In view of the above, the average particle diameter dg (μm) of the graphite can be particularly 4 μm or more, and more particularly, 6 μm or more. On the other hand, when the graphite with a particle diameter being too large is used as a negative electrode active material, the load characteristic of the battery can be decreased and the roughness of the surfaces of the negative electrode mixture layer can be increased. In view of the above, the average particle diameter dg of the graphite can be particularly 20 μm or less, and more particularly, 15 μm or less.

Also, when the $SiO_x$ has an average particle diameter being too small, the specific surface area of the $SiO_x$ can be increased. As a result, a film derived from the non-aqueous electrolyte can be formed on the negative electrode after assembling the battery. This film can increase the irreversible capacity of the battery. Therefore, the average particle diameter ds (μm) of $SiO_x$ can be 1 μm or more.

Also, the ratio ds/dg (i.e., "ds" for the average particle diameter of $SiO_x$; "dg" for the average particle diameter of graphite) can have the following features. Namely, it is possible to consider advantageously decreasing the volumetric change of the negative electrode mixture layer at the time of the charge and the discharge of the battery, the volumetric change resulting from the volumetric expansion of $SiO_x$. This consideration can suppress the crack thereof, to improve the charge discharge cycle characteristics of the battery. In view of the above, the ratio ds/dg can be particularly 1 or less, and more particularly, 0.5 or less. Namely, when the ds/dg value is too large, the volumetric change in the charge and the discharge of the battery can be increased, thereby causing cracks in the negative electrode mixture layer. In this case, the charge discharge cycle characteristics of the battery can be decreased.

On the other hand, when the ds/dg value is reduced, the average particle diameter of $SiO_x$ becomes small. In this case, the Si crystallite diameter dispersed in the $SiO_x$ can be reduced. Here, however, when the ds/dg value is too small, it becomes difficult to secure the conductivity of the negative electrode mixture layer. In such a case, for example, it can be required to increase the amount of the binder in the negative electrode mixture layer, which, however, brings about a capacity drop. In view of the above, the ds/dg value can be particularly 0.05 or more, and more particularly, 0.1 or more.

The phrases "average particle diameter of $SiO_x$" and "average particle diameter of the graphite" in the specification of the present application are with respect to the volume mean values (D50) which can be measured by a laser diffraction granulometry metrology.

Also, in the negative electrode of the present invention, it is possible to consider advantageously avoiding the problems associated with the volumetric change of $SiO_x$ during the charge and the discharge. In view of the above, in 100 mass % of the total amounts of the composite of $SiO_x$ and carbon material in combination of the graphite in the negative electrode active materials, the ratio of the graphite can be particularly 70 mass % or more, and more particularly, 75 mass % or more, and yet more particularly, 85 mass % or more. On the other hand, it is possible to consider effectively securing the effects to obtain a high capacity by using the $SiO_x$. In view of the above, in 100 mass % of the total amounts of the composite of $SiO_x$ and carbon material in combination of the graphite in the negative electrode active material, the ratio of the graphite can be particularly 99 mass % or less, and more particularly, 97 mass % or less.

The binder used in the negative electrode material mixture layer can be, for example, polyvinylidene fluoride (PVDF), polytetrafluoroethylene (PTFE), styrene-butadiene rubber (SBR), and carboxymethylcellulose (CMC). Furthermore, the negative electrode material mixture layer can include a conductive assistant such as various carbon black (e.g., acetylene black), carbon nanotube, and carbon fiber.

The negative electrode of the present invention can be manufactured as follows. Namely, a negative electrode active material and a binder, and a conductive assistant if necessary, are dispersed in a solvents such as N-methyl-2-pyrrolidone (NMP) and water to prepare a negative electrode mixture containing composition. Here, it is noted that the binder can be dissolved in the solvent. The composition above is applied on one side or both sides of a current collector, and then, dried. Then, a calendar process is applied, if necessary, to obtain a negative electrode. It is noted that the method for manufacturing the negative electrode is not limited to the description above, and other methods can be used.

In the negative electrode of the present invention, the thickness of the negative electrode material mixture layer can be particularly 10 to 100 μm on each side of the current collector. Also, the density (*) of the negative electrode mixture layer can be 1.0 to 1.9 g/cm³. Note here that the density (*) above can be calculated from the mass and the thickness in a unit area of the negative electrode mixture layer stacked on the current collector. In the composition of the negative electrode mixture layer, the negative electrode active material can be particularly included at 80 to 99 mass %; the binder can be particularly included at 1 to 20 mass %; and the conductive assistant can be particularly included at 1 to 10 mass %.

As a negative electrode current collector, there can be used metal foil, punched metal, metal mesh, expanded metal or the like made of copper or nickel. In particular, a copper foil can be used. In particular, when the thickness of the entire negative electrode is made thinner to obtain a high energy density battery, the negative electrode current collector can be designed to have a thickness with an upper limit of 30 μm. In order to ensure the mechanical strength, the lower limit thereof can be particularly 5 μm.

The non-aqueous secondary battery of the present invention can only require to provide the negative electrode, and the positive electrode containing the Li-containing transition metal oxide. The other structures are not necessarily limited, and any can be adopted which have been known for the conventional non-aqueous secondary batteries.

The positive electrode of the inventive non-aqueous secondary battery can be characterized as follows. For example, it can be made of a positive electrode mixture layer including a positive electrode active material, a binder, and a conductive assistant; the positive electrode mixture layer has been formed on one side or both sides of a current collector.

The positive electrode active material can be a Li-containing transition metal oxide that allows Li (lithium) ions to absorb and release. Such a Li-containing transition metal oxide is conventionally known for the use in non-aqueous secondary batteries such as lithium-ion secondary batteries. The examples thereof can include Li-containing transition metal oxides having a layered structure such as: $Li_yCoO_2$ (here, $0 \le y \le 1.1$); $Li_zNiO_2$ (here, $0 \le z \le 1.1$); $Li_eMnO_2$ (here, $0\le e\le 1.1$); $Li_aCo_bM^1_{1-b}O_2$ ($M^1$ is at least one kind of metal element selected from the group as follows: Mg, Mn, Fe, Ni, Cu, Zn, Al, Ti, and Ge and Cr; $0\le a\le 1.1$; $0<b<1.0$); $Li_cNi_{1-d}M^2_dO_2$ ($M^2$ is one or more elements including at least one metal element selected from the group as follows: Mg, Mn, Fe, Co, Cu, Zn, Al, Ti, and Ge and Cr; $0\le c\le 1.1$, $0<d<1.0$); and $Li_fMn_gNi_hCo_{1-g-h}O_2$ ($0\le f\le 1.1$; $0<g<1.0$; and $0<h<1.0$). These materials can be used alone or in combination.

In addition, the positive electrode active material can be a Li-containing transition metal oxide having a layer structure that is mainly composed of Ni. Such an oxide can be shown by the following general composition formulas (1):

$$Li_{1+x}MO_2 \qquad (1)$$

The general composition formula (1) can satisfy $-0.3\le x\le 0.3$. M represents an element group at least including Ni, Mn and Mg. Assume that "a," "b," and "c," respectively, represent the ratios (mol %) of Ni, Mn, and Mg in the total element group (M). Here, $70\le a\le 97$, $0.5<b<30$, $0.5<c<30$, $-10<b-c<10$ and $-8\le(b-c)/c\le 8$ can be satisfied.

Also, the Li-containing transition metal oxide expressed by the general composition formula (1) can have the following features: the average valence of Ni is 2.5 to 3.2; the average valence of Mn is 3.5 to 4.2; and the average valence of Mg is 1.8 to 2.2.

Ni in the Li-containing transition metal oxide expressed by the general composition formula (1) is an element that contributes to the capacity increase of the Li-containing transition metal oxide. In 100 mol % of the total element group M in the general composition formula (1) expressing the Li-containing transition metal oxide, the ratio "a" (mol %) for the element Ni can be 70 mol % or more in order to improve the capacity increase of the Li-containing transition metal oxide. However, when the Ni ratio in the element group M is too large, the amounts of Mn and Mg can be decreased, thereby deteriorating the expected effects therefrom. Therefore, the ratio "a" (mol %) for the element Ni can be 97 mol % or less in the general composition formula (1).

When the Ni ratio in the element group M of the Li-containing transition metal oxide is adjusted in the manner as specified above, the following features can be found. Namely, when the driving voltage is set at 2.5V to 4.3V at the lithium metal standard, the capacity of the Li-containing transition metal oxide can be 185 mAh/g or more. Of course, when the Li-containing transition metal oxide is used in a positive electrode, the upper limit of the charge voltage can be set at 4.3V or more, e.g., a range of 4.3V to 4.6V, at the lithium metal standard Also, the Li-containing transition metal oxide expressed by the general composition formula (1) can have the following features. Namely, as the average valence of Ni becomes smaller, the conductivity can be decreased. In view of the above, in the Li-containing transition metal oxide shown by the general composition formula (1), in order to make a Li-containing transition metal oxide having a high capacity, the average valence of Ni can be 2.5 to 3.2, which can be measured by the method as explained later.

With respect to the Li-containing transition metal oxide expressed by the general composition formula (1), the average valence of each Ni, Mn and Mg can be measured as follows. For example, a BL4 beam port with a compact superconducting radiation source "AURORA" (manufactured by Sumitomo Electric Industries Ltd.) can be used in the SR Center, the Ritsumeikan University. Here, an X-ray absorption spectroscopy (XAS) can be carried out. The data as obtained can be analyzed based on Journal of the Electrochemical Society, 146, p. 2799-2809 (1999). Then, "REX," i.e., analysis software, can be used, which is provided by Rigaku Corporation.

First, from the state analysis above, the position of the K-absorption edge of each of Ni, Mn, and Mg can be calculated for the lithium-containing composite oxide expressed by the general composition formula (1).

Then, the average valence of Ni in the Li-containing transition metal oxide expressed by the general composition formula (1) can be determined as follows. Here, the reference samples used are: NiO and $LiNi_{0.5}Mn_{1.5}O_4$ (i.e., reference samples of the compound containing Ni with an average valence of 2); and $LiNi_{0.82}Co_{0.15}Al_{0.03}O_2$ (i.e., reference sample of the compound containing Ni with an average valence of 3). Using these reference samples, the same state analysis as applied to the lithium-containing transition metal oxide expressed by the general composition formula (1) is carried out. Then, a regression line that represents the relationship between the position of the K-absorption edge of Ni and the valence of Ni is created for each of the reference samples. Then, comparing the regression line with the position of the K-absorption edge of Ni of the lithium-containing transition metal oxide expressed by the general composition formula (1), the average valence of Ni can be obtained.

Also, the average valence of Mn in the Li-containing transition metal oxide expressed by the general composition formula (1) can be determined as follows. Here, the reference samples used are: $MnO_2$, $Li_2MnO_3$, and $LiNi_{0.5}Mn_{1.5}O_4$ (i.e., reference samples of the compound containing Mn with an average valence of 4); $LiMn_2O_4$ (i.e., reference sample of the compound containing Mn with an average valence of 3.5); $LiMnO_2$ and $Mn_2O_3$ (i.e., reference samples of the compound containing Mn with an average valence of 3); and MnO (i.e., reference sample of the compound containing Mn with an average valence of 2). Using these reference samples, the same state analysis as applied to the lithium-containing transition metal oxide expressed by the general composition formula (1) is carried out. Then, a regression line that represents the relationship between the position of the K-absorption edge of Mn and the valence of Mn is created for each of the reference samples. Then, comparing the regression line with the position of the K-absorption edge of Mn in the lithium-containing transition metal oxide expressed by the general composition formula (1), the average valence of Mn can be obtained.

Furthermore, the average valence of Mg in the lithium-containing transition metal oxide expressed by the general composition formula (1) can be determined as follows. Here, the reference samples used are: MgO and $MgAl_2O_4$ (i.e., reference samples of the compound containing Mg with a average valence of 2) and Mg (i.e., reference sample of Mg with an average valence of 0). Using these reference samples, the same state analysis as applied to the lithium-containing transition metal oxide expressed by the general composition formula (1) is carried out. Then, a regression line for each of the reference samples is created which represents the relationship between the position of the K-absorption edge of Mg and the valence of Mg. Then, comparing the regression line with the position of the K-absorption edge of Mg of the lithium-containing transition metal oxide expressed by the general composition formula (1), the average valence of Mg can be obtained.

Also, the Li-containing transition metal oxide shown by the general composition formula (1) can have the following features. Namely, in 100 mol % of the total element group M, the ratio b (mol %) for the element of Mn and the ratio c (mol %) for the element of Mg can satisfy $0.5<b<30$, $0.5<c<30$, $-10<b-c<10$, and $-8\leq(b-c)/c\leq 8$. In this case, Mn and Mg are present in the crystal lattice. As a result, when a phase dislocation in the Li-containing transition metal oxide occurs due to the insertion and the release of the Li, the $Mg^{2+}$ ions can move into the Li site. Thus, the irreversible reaction can be suppressed. Accordingly, the reversibility can be improved for the layered crystal structure of the Li-containing transition metal oxide represented by a space group, R3-m. Also, Mn being tetravalent can stabilize Mg being divalent. As a result, the non-aqueous secondary battery can be provided with a long charge-discharge cycle life.

It is possible to consider more excellently securing the effects to stabilize the divalent Mg by Mn, as follows. In this respect, the ratio "b" of Mn to all the element group M in the general composition formula (1) can be particularly 1 mol % or more, and more particularly, 2 mol % or more. On the other hand, the ratio "b" can be particularly 10 mol % or less, and more particularly, 7 mol % or less. Also, it is possible to consider excellently securing the effects to improve the reversibility of the layered crystal structure of the Li-containing transition metal oxide by Mg. In this respect, the ratio "c" of Mg to all the element group M in the general composition formula (1) can be particularly 1 mol % or more, and more particularly, 2 mol % or more. It is, however, noted that Mg is less involved in the charge discharge capacity, so that the capacity might decrease when Mg is added at a large amount. Therefore, in the Li-containing transition metal oxide expressed by the general composition formula (1), the ratio "c" can be particularly 15 mol % or less, and more particularly, 10 mol % or less, and further more particularly, 7 mol % or less. Furthermore, in the Li-containing transition metal oxide expressed by the general composition formula (1), it is advantageous when the difference of the composition ratio between Mn and Mg becomes mall. Thus, a relationship of $-3\leq b-c\leq 3$ can be particularly satisfied, and more in particular, a relationship of $-2\leq(b-c)/c\leq 2$ can be satisfied.

The Li-containing transition metal oxide expressed by the general composition formula (1) can have the following features. Namely, it is possible for the average valence of Mg to consider improving the reversibility of the crystal structure of the Li-containing transition metal oxide. In this respect, the average valence of Mg can be 1.8 to 2.2, which is determined by the measurement method as described before. Also, in the Li content transition metal oxide shown by the general composition formula (1), the average valence of Mn can be made to stabilize the Mg and effectively exhibit its function. In this respect, the average valence of Mn can be 3.5 to 4.2, which is determined by the measurement method as described before.

The element group M in the general composition formula (1) of the Li-containing transition metal oxide can include at least Ni, Mn and Mg, and moreover, can be composed of only these three elements.

Moreover, the element group M can include four or more elements; Co can be included in addition to Ni, Mn, and Mg. When Co is included in the element group M, Co is present in the crystal lattice of the Li-containing transition metal oxide. This can further suppress the irreversible reaction caused by the phase dislocation in the Li-containing transition metal oxide due to the release and the insertion of Li during the charge and the discharge of the non-aqueous secondary battery. Accordingly, the reversibility of the crystal structure of the Li-containing transition metal oxide can be improved. As a result, the non-aqueous secondary battery can exhibit a long charge-discharge cycle life.

In the case of the element group M including Co, the following features can be there. Namely, the ratio "d" (mol %) for the element of Co can be particularly $0<d<30$ in 100 mol % of the total element group M. This range can avoid the decrease of the amounts of the other element group M (i.e., Ni, Mn and Mg), without deteriorating the effects therefrom. Also, when Co is included in the element group M, it is possible to consider adequately ensuring the effects by Co to improve the reversibility of the crystal structure of the Li-containing composite oxide. In this respect, the ratio "d" for Co can be particularly 1 mol % or more.

In addition, the Li content transition metal oxide shown by the general composition formula (1) can have the following features. Namely, the average valence of Co can be 2.5 to 3.2. In this case, the effects by Co can be adequately ensured. Here, the average valence can be determined by the measurement method described before.

The element group M in the general composition formula (1) of the Li-containing transition metal oxide can include elements other than Ni, Mn, Mg and Co. For example, the element group M can include Ti, Cr, Fe, Cu, Zn, Al, Ge, Sn, Ag, Ta, Nb, Mo, B, P, Zr, Ga, Ba, Sr, Ca, Si, W, and S. It is, however, noted that in order to sufficiently achieve the effects by using the Li-containing transition metal oxide expressed by the general composition formula (1), the following features can be there. Namely, in 100 mol % of the total element group M, the ratio of the elements other than Ni, Mn, Mg and Co can be particularly 15 mol % or less, and more particularly, 3 mol % or less. Also, the elements other than Ni, Mn, Mg and Co as the element group M can be either uniformly distributed in the Li-containing transition metal oxide, or disproportionately distributed on the particle surfaces of the Li-containing transition metal oxide.

Among the elements belong to the element M, particularly used can be Zr or Ti. The inclusion of such an element can further improve the charge discharge cycle characteristics of the non-aqueous secondary battery.

The element(s), Zr and Ti, can be uniformly present in the Li-containing transition metal oxide, but rather, can be disproportionately distributed on the particle surfaces of the Li-containing transition metal oxide. When disproportionately distributed, the surface activity of the Li-containing transition metal oxide can be suppressed without impairing the electrochemical properties. As a result, the Li-containing transition metal oxide can effectively exhibit the effects to improve the charge discharge cycle characteristics, the high-temperature storage characteristics, and the thermal stability.

Therefore, the particle surfaces of the Li-containing transition metal oxide expressed by the general composition formula (1) can be coated with a compound containing Zr or Ti such as Zr oxide or Ti oxide. As a result, impurities or by-products can be reduced on the particle surfaces of the Li-containing transition metal oxide. Thus, when a positive electrode mixture layer is prepared by using a composition in a paste or slurry (i.e., paint) including the Li-containing transition metal oxide expressed by the general composition formula (1), a gelation phenomena of the composition can be suppressed. As a result, the coating stability can be improved.

The Li-containing transition metal oxide including Zr or Ti can have the following features. In order to prevent the capacity reduction of the Li-containing transition metal oxide, the Zr or Ti content (*) can be particularly 5 mass % or less, and more particularly 1 mass % or less in all the particles (**) of the Li-containing transition metal oxide including Zr and Ti. Here, note that the Zr or Ti content (*) above is the amount of either Zr or Ti when one is included, and the total amounts thereof when both are included; and the same standards apply hereinafter. Note also that all the particles (**) above include a coating when the surfaces are coated with a Zr-containing compound or Ti-containing compound; and the same standards apply hereinafter. On the other hand, when the Li-containing transition metal oxide expressed by the general composition formula (1) contains Zr or Ti, it is possible to consider sufficiently achieving the effects to suppress the surface activity of the Li-containing transition metal oxide. In view of the above, the content of Zr or Ti can be particularly 0.001 mass % or more, in the total particles of the Li-containing transition metal oxide expressed by the general composition formula (1) containing Zr or Ti.

The Li-containing transition metal oxide including the composition expressed by the general composition formula (1) can have the following features. Namely, the true density can be a high value of 4.55 to 4.95 g/cm$^3$. In this case, the capacity of the active material in unit mass can be increased. Furthermore, a material with excellent reversibility can be obtained.

Also, the true density of the Li-containing transition metal oxide expressed by the general composition formula (1) can become high enough, especially when the composition is close to a stoichiometric ratio. Therefore, the general composition formula (1) can satisfy $-0.3 \leq x \leq 0.3$. By controlling the value of "x" within the range above, the true density and the reversibility of the Li-containing transition metal oxide can be improved. In particular, "x" can be −0.1 or more, and 0.1 or less. In this case, the Li-containing transition metal oxide can be provided with a higher true density of 4.6 g/cm$^3$ or more.

Here, x<0 means that Li is short of the stoichiometric ratio. In this case, when the Li-containing transition metal oxide is synthesized, Ni enters the Li site to form a Li layer composing the layered structure of the Li-containing transition metal oxide. In this case, a structural distortion can be likely caused. Assume that $I_{(003)}$ and $I_{(104)}$, respectively, represents the integrated intensity of a diffraction line at a (003) plane and the integrated intensity of a diffraction line at a (104) plane in an X-ray diffraction diagram of the Li-containing transition metal oxide. Here, in order to obtain a stable structure, the ratio of $I_{(003)}$ to $I_{(004)}$ (integrated intensity ratio: $I_{(003)}/I_{(104)}$) can be particularly adopted to be 1.2 or more. However, if a structural distortion occurs as explained above, the integrated intensity ratio can be less than 1.2, which results in decreasing the charge discharge capacity. In this case, the effects to improve the charge discharge cycle characteristics can be deteriorated in the non-aqueous secondary battery using such a positive electrode active material.

However, by dissolving Mg in the crystal to form a solid solution, the Li layer can be easily formed even in the case of x<0. As a result, Ni can be prevented from entering the Li layer, and the integrated intensity ratio $I_{(003)}/I_{(104)}$ can satisfy 1.2 or more. As a result, the reversibility of the crystal structure can be improved to obtain a Li-containing transition metal oxide having a high capacity and excellent charge discharge cycle characteristics.

Moreover, when the composition is designed in such a way that the Li ratio is smaller than the stoichiometric ratio, the Li amount used in preparation of the Li-containing transition metal oxide can be reduced. As a result, generation of surplus compounds such as $Li_2CO_3$ and LiOH, and their remaining can be prevented. Therefore, the quality deterioration due to the surplus compounds can be suppressed for the positive electrode mixture containing composition. Thus, the preparation of the composition and its quality control can be made easy.

Also, in the inventive negative electrode active material, the material containing Si and O used therein is relatively large in the irreversible capacity. However, when the Li-containing transition metal oxide expressed by the general composition formula (1) is used as a positive electrode active material, the irreversible capacities can be offset. As a result, the efficiency in the charge and the discharge of the entire battery can be improved.

The binder used for the positive electrode material mixture layer can be the same as used in the negative electrode material mixture layer, as listed before. The examples of the conductive assistant used for the positive electrode material mixture layer can include carbon materials including: graphite (i.e., graphite carbon material) such as natural graphite (e.g., scaly graphite) and artificial graphite; carbon black such as acetylene black, ketjen black, channel black, furnace black, lamp black, and thermal black; carbon fiber.

The positive electrode can be manufactured as follows. Namely, a positive electrode mixture containing composition in a paste or slurry form can be prepared by dispersing a positive electrode active material, a binder, and a conductive assistance in a solvent such as NMP. It is noted that the binder here can be dissolved in the solvent. The composition above is applied on one side or both sides of a current collector, and then, dried. Then, a press process is applied, if necessary, to obtain a positive electrode. It is noted that the method for manufacturing the positive electrode is not limited to the description here, and other methods can be used.

The thickness of the positive electrode mixture layer can be particularly 10 to 100 µm for each side of the current collector. The density (*) of the positive electrode mixture layer can be particularly 3.0 to 4.5 g/cm$^3$. Here, the density (*) can be calculated from the mass and the thickness in the unit area of the positive electrode mixture layer stacked on the current collector. In the composition of the positive electrode mixture layer, the positive electrode active material can be particularly included at 60 to 95 mass %; the binder can be particularly included at 1 to 15 mass %; and the conductive assistant can be particularly included at 3 to 20 mass %.

The same or similar current collector can be used as conventionally having known for the positive electrode of non-aqueous secondary batteries. For example, an aluminum foil having a thickness of 10 to 30 µm can be particularly used.

The non-aqueous electrolyte used in the inventive battery can be an electrolytic solution prepared by dissolving a lithium salt, as listed later, with a solvent as follows.

The solvent can be aprotic organic solvents such as ethylene carbonate (EC), propylene carbonate (PC), butylene carbonate (BC), dimethyl carbonate (DMC), diethyl carbonate (DEC), methyl ethyl carbonate (MEC), γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric trimester, trimethoxymethane, dioxolane derivative, sulfolane, 3-methyl-2-oxazolidinone, propylene carbonate derivative, tetrahydrofuran derivative, diethyl ether, and 1,3-propane sultone. The solvent can be used alone or in combinations thereof.

The examples of the lithium salt can include: $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lower aliphatic carboxylic acid Li, $LiAlCl_4$, LiCl, LiBr, LiI, chloroborane Li, tetraphenylboric acid Li, $Li_2C_2F_4(SO_3)_2$, $LiN(CF_3SO_2)_2$, $LiC(CF_3SO_2)_3$, $LiC_nF_{2n+1}SO_3$ (n≥2), $LiN(RfOSO_2)_2$ [where Rf is a fluoroalkyl group]. These can be used alone or in combination.

Among the electrolyte dissolving the lithium salt in the solvent, the following electrolyte solution can be particularly used; the solvent is at least one of dimethyl carbonate, diethyl carbonate and ethyl methyl carbonate, in combination with ethylene carbonate or propylene carbonate; and the lithium salt is at least one of $LiClO_4$, $LiBF_4$, $LiPF_6$ and $LiCF_3SO_3$. The concentration of the lithium salt in the electrolyte can be particularly 0.2 to 3.0 mol/dm³, and more particularly, 0.5 to 1.5 mol/dm³, and yet more particularly 0.9 to 1.3 mol/dm³.

Also, for the purpose to further improve the non-aqueous electrolyte in view of the safety, the charge discharge cycle property, and the high temperature storage characteristics, there can be the following features. Namely, additives such as vinylene carbonates, 1,3-propane sulton, diphenyl disulfide, cyclohexylbenzene, biphenyl, fluorobenzene, fluoroethylene carbonate, difluoroethylene carbonate, t-butylbenzene, triethylphosphate, triethyl phosphonoacetate, etc. can be added, if necessary.

For example, when the non-aqueous electrolyte contains vinylene carbonate, the content of the vinylene carbonate can be particularly 0.01 to 5 mass % in the non-water electrolyte having used in a battery.

Also, when the negative electrode includes a $SiO_x$ material composed of Si and O, and if the electrolyte includes a fluorine-containing additive such as fluoroethylene carbonate or difluoroethylene carbonate, it is expected that the non-aqueous electrolyte can further improve the charge discharge cycle characteristics.

The non-aqueous electrolyte used in the non-aqueous secondary battery can include a known gelatinizer such as polymer to make it in a gel form (i.e., gel electrolyte).

The separator used in the inventive battery can be provided with enough strength and have a good retention of the electrolyte. In view of the above, the examples used can be fine porous films or unwoven cloth of e.g., polyethylene, polypropylene and ethylene propylene copolymers, having a thickness of 10 to 50 μm and a porosity rate of 30 to 70%.

Also, the separator for the inventive battery can have the following features. Namely, it can be of a composite separator in which the surface or inside of the fine porous films or unwoven cloth has formed a heat resistance porous layer mainly composed of heat resistance fine particles, in order to improve its heat resistance. Here, the visual observation confirms that the heat resistance porous layer shows no change in the shape, e.g., deformation, at least at a temperature of 150° C. Moreover, the heat resistance porous layer can be formed of insulate inorganic or organic fine particles fixed by using a binder.

The examples of the inorganic fine particles used as the heat-resistant fine particles can be: fine particles of inorganic oxides such as an iron oxide, silica ($SiO_2$), alumina ($Al_2O_3$), $TiO_2$, and $BaTiO_3$; fine particles of inorganic nitrides such as an aluminum nitride and a silicon nitride; fine particles of hardly-soluble ionic crystals such as a calcium fluoride, a barium fluoride, and a barium sulfate; and fine particles of covalent crystals such as silicon and diamond. The inorganic oxide fine particles can be fine particles of materials derived from the mineral resources such as boehmite, zeolite, apatite, kaoline, mullite, spinel, olivine, and mica or artificial products of these materials. Moreover, the inorganic fine particles can be electrically insulating particles obtained by coating the surfaces of a conductive material with a material having electrical insulation (e.g., the inorganic oxides as listed above). The examples of the conductive material can include: metals; conductive oxides such as $SnO_2$ and indium tin oxide (ITO); and carbonaceous materials such as carbon black and graphite.

The examples of the organic fine particles used as heat-resistant fine particles can include: fine particles of cross-linked polymers such as polyimide, a melamine resin, a phenol resin, cross-linked polymethyl methacrylate (cross-linked PMMA), cross-linked polystyrene (cross-linked PS), polydivinylbenzene (PDVB), and a benzoguanamine-formaldehyde condensation product; and fine particles of heat-resistant polymers such as thermoplastic polyimide. The organic resin (i.e., polymer) forming the organic fine particles can be a mixture of compounds as listed above, a modified product thereof, a derivative thereof, a copolymer (e.g., a random copolymer, an alternating copolymer, a block copolymer, or a graft copolymer), or a cross-linked product (i.e., in case of a heat-resistant polymer) of the compounds as listed above.

The above examples of the heat-resistant fine particles can be used alone or in combination of two or more. Among the heat-resistant fine particles, the inorganic oxide fine particles can be particularly used, and more particularly, alumina, silica, and boehmite can be used.

The configuration or shape of the non-aqueous secondary battery of the present invention is not particularly limited. The non-aqueous secondary battery can be in any configuration, such as a shape of coin, button, sheet, laminate, cylinder, flat, or prism, or a large size including electric vehicles or the like. As described above, if the kind of the negative electrode active material of the invention is used, it is likely that the problems of the battery expansion can occur especially in case of a battery configuration whose outer can having a prismatic shape (i.e., a rectangular prism shape), a flattened shape, a laminate film, and etc., each having a small thickness relative to the width. However, the battery of the present invention has been contemplated to effectively suppress the generation of such battery expansion. Therefore, especially in case of such a prismatic or flattened battery having the outer body (i.e., outer can) as described above, the effects of the present invention can be significantly exhibited.

Incorporation of the positive electrode, the negative electrode, and the separator in a non-aqueous secondary battery can depend on the kinds of the battery. The examples used can include a rolled electrode body in which multiple positive electrodes and multiple negative electrodes are stacked with intervention of separators; or a rolled electrode body in which a positive electrode and a negative electrode are stacked via a separator, and then, wound spirally. It is noted that when $SiO_x$ is used as a negative electrode active material and especially when it is made into a rolled electrode body, problems due to the deformation resulting from the negative electrode volume change are likely to occur. However, in case of the battery using the inventive negative electrode (i.e., the battery of the present invention), the deformation due to the negative electrode volume change can be effectively suppressed As a result, the effects can be significantly exhibited especially when the battery has contained a rolled electrode body (in particular, a rolled electrode body of which the cross-section perpendicular to the axis around which the components are wound is flat and that is used in a prismatic battery or a flat battery that uses a flat outer jacket, a laminate film outer body, or the like).

EXAMPLES

Next, the present invention is described in detail with reference to the examples. However, the examples here should not be construed to limit the scope of the present invention.

Example 1

Preparation of Positive Electrode $LiNi_{0.6}Co_{0.2}Mn_{0.2}O_2$ (a positive electrode active material; 88 parts by mass), artificial graphite (a conductive assistant; 1 part by mass), ketjen black (1 part by mass), and: PVDF (a binder, 10 parts by mass) were uniformly mixed into NMP, a solvent, to obtain a positive electrode mixture containing paste. The positive electrode mixture containing paste was intermittently applied on both sides of an aluminum foil (thickness: 15 μm), adjusting the thickness, and then, dried. Then, a calendar process was applied to adjust the overall thickness of the positive electrode mixture layer to become 183 μm. As a result a positive electrode was obtained.

Preparation of Negative Electrode

SiO particles heated in a boiled bed reactor at about 1000° C. were contacted with a mixture gas of methane and nitrogen having a temperature of 25° C., to thereby carry out a vapor-phase method. As a result, the surfaces of the SiO particles have formed a coating layer of a carbon material. Thus, a composite of SiO and carbon material (the average particle diameter D50: 1 μm; the ratio of SiO: 70 mass %; and the crystallite diameter of Si in SiO: 40 nm) was obtained. The composite of SiO and carbon material, as obtained, was mixed with graphite (average particle diameter D50 was 20 μm) at a mass ratio of 15:85 to obtain a mixture. This mixture (98 parts by mass) was mixed with a CMC aqueous solution having adjusted viscosity within the range of 1500 to 5000 mPa·s (the concentration of 1% by mass; 1 part by mass) and SBR (1 part by mass) to obtain an aqueous negative electrode mixture containing paste. It is noted that in all the Examples and Comparative Examples as explained later, the "composite of SiO and carbon material" is referring to one in which the SiO surface was coated with carbon in the same manner as Example 1.

Adjusting the thickness, the negative electrode mixture containing paste was intermittently applied on both sides of a current collector made of a copper foil having a thickness of 8 μm. After drying, a calendar process was applied to adjust the overall thickness of the negative electrode mixture layer to become 108 μm, thereby to obtain a negative electrode.

Preparation of Non-Aqueous Electrolyte

Ethylene carbonate, ethylmethyl carbonate and diethyl carbonate were mixed at a volume ratio of 1:1:1. Into the mixture, $LiPF_6$ as a lithium salt was dissolved such that its concentration became 1 mol/l to obtain a non-aqueous electrolyte.

Assembling of Battery

The positive electrode and the negative electrode, as obtained above, were cut into a predetermined size. Intervening therebetween a separator made of a fine porous polyethylene film having a thickness of 16 μm and a porosity of 50%, a rolled electrode was prepared. This rolled electrode was inserted in 463450 prism-shaped battery can. Then, the non-aqueous electrolyte was injected inside the can. Then, the can was sealed to obtain a 463450 prism-shaped non-aqueous secondary battery.

Example 2

Graphite having an average particle diameter D50 of 4 μm was used. Except for the change noted here, the same processes as used in Example 1 were carried out to prepare a negative electrode. Except for the change to use the negative electrode, the same processes as used in Example 1 were carried out to prepare a prism-shaped non-aqueous secondary battery.

Example 3

Graphite having an average particle diameter D50 of 10 μm was used. In the composite of SiO and carbon material, the average particle diameter D50 of the SiO was 10 μm. Except for the change noted here, the same processes as used in Example 1 were carried out to prepare a negative electrode. Except for the change to use the negative electrode, the same processes as used in Example 1 were carried out to prepare a prism-shaped non-aqueous secondary battery.

Example 4

Graphite having an average particle diameter D50 of 10 μm was used. Except for the change noted here, the same processes as used in Example 1 were carried out to prepare a negative electrode. Except for the change to use the negative electrode, the same processes as used in Example 1 were carried out to prepare a prism-shaped non-aqueous secondary battery.

Example 5

Graphite having an average particle diameter D50 of 10 μm was used. In the composite of SiO and the carbon material, the ratio of the SiO was 95 mass %. Except for the change noted here, the same processes as used in Example 1 were carried out to prepare a negative electrode. Except for the change to use the negative electrode, the same processes as used in Example 1 were carried out to prepare a prism-shaped non-aqueous secondary battery.

Example 6

Adjusting the applied amount of the positive electrode mixture containing paste, the overall thickness after the calendar process was set to be 197 μm. Except for the change noted here, the same processes as used in Example 1 were carried out to prepare a positive electrode. Also, the mixing ratio (i.e., mass ration) of the composite of SiO and carbon material to the graphite was adjusted into 30:70. Adjusting the applied amount of the negative electrode mixture containing paste, the overall thickness after the calendar process was set to be 98 μm. Except for the change noted here, the same processes as used in Example 1 were carried out to prepare a negative electrode. Except for the change to use the positive electrode and the negative electrode, the same processes as used in Example 1 were carried out to prepare a prism-shaped non-aqueous secondary battery.

Example 7

Graphite having an average particle diameter D50 of 4 µm was used. Except for the change noted here, the same processes as used in Example 6 were carried out to prepare a negative electrode. Except for the change to use the negative electrode, the same processes as used in Example 6 were carried out to prepare a prism-shaped non-aqueous secondary battery.

Example 8

Adjusting the applied amount of the positive electrode mixture containing paste, the overall thickness after the calendar process was set to be 209 µm. Except for the change noted here, the same processes as used in Example 1 were carried out to prepare a positive electrode. Also, the mixing ratio (i.e., mass ration) of the composite of SiO and carbon material to the graphite was adjusted into 40:60. Adjusting the applied amount of the negative electrode mixture containing paste, the overall thickness after the calendar process was set to be 82 µm. Except for the change noted here, the same processes as used in Example 1 were carried out to prepare a negative electrode. Except for the change to use the positive electrode and the negative electrode, the same processes as used in Example 1 were carried out to prepare a prism-shaped non-aqueous secondary battery.

Example 9

Graphite having an average particle diameter D50 of 4 µm was used. Except for the change noted here, the same processes as used in Example 8 were carried out to prepare a negative electrode. Except for the change to use the negative electrode, the same processes as used in Example 8 were carried out to prepare a prism-shaped non-aqueous secondary battery.

Comparative Example 1

Graphite having an average particle diameter D50 of 25 µm was used. In the composite of SiO and carbon material, the average particle diameter D50 of the SiO was 2 µm. Except for the change noted here, the same processes as used in Example 1 were carried out to prepare a negative electrode. Except for the change to use the negative electrode, the same processes as used in Example 1 were carried out to prepare a prism-shaped non-aqueous battery.

Comparative Example 2

Graphite having an average particle diameter D50 of 2 µm was used. Except for the change noted here, the same processes as used in Example 1 were carried out to prepare a negative electrode. Except for the change to use the negative electrode, the same processes as used in Example 1 were carried out to prepare a battery.

Comparative Example 3

Graphite having an average particle diameter D50 of 10 µm was used. In the composite of SiO and carbon material, the average particle diameter D50 of the SiO was 13 µm. Except for the change noted here, the same processes as used in Example 1 were carried out to prepare a negative electrode. Except for the change to use the negative electrode, the same processes as used in Example 1 were carried out to prepare a battery.

Comparative Example 4

Graphite having an average particle diameter D50 of 10 µm was used. In the composite of SiO and carbon material, the average particle diameter D50 of the SiO was 0.4 µm. Except for the change noted here, the same processes as used in Example 1 were carried out to prepare a prism-shaped non-aqueous secondary battery.

Comparative Example 5

In the composite of SiO and carbon material, the ratio of the SiO was 98 mass % in the total of the SiO and the carbon material. Except for the change noted here, the same processes as used in Example 4 were carried out to prepare a negative electrode. Except for the change to use the negative electrode, the same processes as used in Example 1 were carried out to prepare a prism-shaped non-aqueous secondary battery.

Comparative Example 6

In the composite of SiO and carbon material, the ratio of the SiO was 50 mass % in the total of the SiO and the carbon material. Except for the change noted here, the same processes as used in Example 4 were carried out to prepare a negative electrode. Except for the change to use the negative electrode, the same processes as used in Example 1 were carried out to prepare a prism-shaped non-aqueous secondary battery.

Comparative Example 7

In the composite of SiO and carbon material, the crystallite diameter of Si in the SiO was 60 nm. Except for the change noted here, the same processes as used in Example 4 were carried out to prepare a negative electrode. Except for the change to use the negative electrode, the same processes as used in Example 1 were carried out to prepare a prism-shaped non-aqueous secondary battery.

Comparative Example 8

Graphite having an average particle diameter D50 of 25 µm was used. In the composite of SiO and carbon material, the average particle diameter D50 of the SiO was 2 µm. Except for the change noted here, the same processes as used in Example 6 were carried out to prepare a negative electrode. Except for the change to use the negative electrode, the same processes as used in Example 6 were carried out to prepare a prism-shaped non-aqueous secondary battery.

Comparative Example 9

Graphite having an average particle diameter D50 of 4 µm was used. In the composite of SiO and carbon material, the average particle diameter D50 of the SiO was 5 µm. Except for the change noted here, the same processes as used in Example 6 were carried out to prepare a negative electrode. Except for the change to use the negative electrode, the same processes as used in Example 6 were carried out to prepare a prism-shaped non-aqueous secondary battery.

Comparative Example 10

Graphite having an average particle diameter D50 of 2 μm was used. Except for the change noted here, the same processes as used in Example 6 were carried out to prepare a negative electrode. Except for the change to use the negative electrode, the same processes as used in Example 6 were carried out to prepare a prism-shaped non-aqueous secondary battery.

Comparative Example 11

Graphite having an average particle diameter D50 of 25 μm was used. In the composite of SiO and carbon material, the average particle diameter D50 of the SiO was 2 μm. Except for the change noted here, the same processes as used in Example 8 were carried out to prepare a negative electrode. Except for the change to use the negative electrode, the same processes as used in Example 8 were carried out to prepare a prism-shaped non-aqueous secondary battery.

Comparative Example 12

Graphite having an average particle diameter D50 of 4 μm was used. In the composite of SiO and carbon material, the average particle diameter D50 of the SiO was 5 μm. Except for the change noted here, the same processes as used in Example 8 were carried out to prepare a negative electrode. Except for the change to use the negative electrode, the same processes as used in Example 8 were carried out to prepare a prism-shaped non-aqueous secondary battery.

Comparative Example 13

Graphite having an average particle diameter D50 of 2 μm was used. Except for the change noted here, the same processes as used in Example 8 were carried out to prepare a negative electrode. Except for the change to use the negative electrode, the same processes as used in Example 8 were carried out to prepare a prism-shaped non-aqueous secondary battery.

Example 10

$Li_{1.0}Ni_{0.89}Co_{0.06}Mn_{0.03}Mg_{0.02}O_2$ and $LiCoO_2$ were weighed at a mass ratio of 3:7. These were mixed for 30 minutes with a HENSCHEL mixer to obtain a mixture. As a positive electrode active material, the mixture as obtained above was used in place of $LiNi_{0.6}Co_{0.2}Mn_{0.2}O_2$. Except for the change noted here, the same processes as used in Example 1 were carried out to prepare a 463450 prism-shaped non-aqueous secondary battery.

Example 11

As a positive electrode active material, the same mixture as used in Example 10 was used in place of $LiNi_{0.6}Co_{0.2}Mn_{0.2}O_2$. Except for the change noted here, the same processes as used in Example 2 were carried out to prepare a 463450 prism-shaped non-aqueous secondary battery.

Example 12

As a positive electrode active material, the same mixture as used in Example 10 was used in place of $LiNi_{0.6}Co_{0.2}Mn_{0.2}O_2$. Except for the change noted here, the same processes as used in Example 3 were carried out to prepare a 463450 prism-shaped non-aqueous secondary battery.

Example 13

As a positive electrode active material, the same mixture as used in Example 10 was used in place of $LiNi_{0.6}Co_{0.2}Mn_{0.2}O_2$. Except for the change noted here, the same processes as used in Example 4 were carried out to prepare a 463450 prism-shaped non-aqueous secondary battery.

Example 14

As a positive electrode active material, the same mixture as used in Example 10 was used in place of $LiNi_{0.6}Co_{0.2}Mn_{0.2}O_2$. Except for the change noted here, the same processes as used in Example 5 were carried out to prepare a 463450 prism-shaped non-aqueous secondary battery.

Example 15

As a positive electrode active material, the same mixture as used in Example 10 was used in place of $LiNi_{0.6}Co_{0.2}Mn_{0.2}O_2$. Except for the change noted here, the same processes as used in Example 6 were carried out to prepare a 463450 prism-shaped non-aqueous secondary battery.

Example 16

As a positive electrode active material, the same mixture as used in Example 10 was used in place of $LiNi_{0.6}Co_{0.2}Mn_{0.2}O_2$. Except for the change noted here, the same processes as used in Example 7 were carried out to prepare a 463450 prism-shaped non-aqueous secondary battery.

Example 17

As a positive electrode active material, the same mixture as used in Example 10 was used in place of $LiNi_{0.6}Co_{0.2}Mn_{0.2}O_2$. Except for the change noted here, the same processes as used in Example 8 were carried out to prepare a 463450 prism-shaped non-aqueous secondary battery.

Example 18

As a positive electrode active material, the same mixture as used in Example 10 was used in place of $LiNi_{0.6}Co_{0.2}Mn_{0.2}O_2$. Except for the change noted here, the same processes as used in Example 9 were carried out to prepare a 463450 prism-shaped non-aqueous secondary battery.

Comparative Example 14

As a positive electrode active material, the same mixture as used in Example 10 was used in place of $LiNi_{0.6}Co_{0.2}Mn_{0.2}O_2$. Except for the change noted here, the same processes as used in Comparative Example 1 were carried out to prepare a 463450 prism-shaped non-aqueous secondary battery.

Comparative Example 15

As a positive electrode active material, the same mixture as used in Example 10 was used in place of $LiNi_{0.6}Co_{0.2}Mn_{0.2}O_2$. Except for the change noted here, the same processes as used in Comparative Example 2 were carried out to prepare a 463450 prism-shaped non-aqueous secondary battery.

Comparative Example 16

As a positive electrode active material, the same mixture as used in Example 10 was used in place of $LiNi_{0.6}Co_{0.2}Mn_{0.2}O_2$. Except for the change noted here, the same processes as used in Comparative Example 3 were carried out to prepare a 463450 prism-shaped non-aqueous secondary battery.

Comparative Example 17

As a positive electrode active material, the same mixture as used in Example 10 was used in place of $LiNi_{0.6}Co_{0.2}Mn_{0.2}O_2$. Except for the change noted here, the same processes as used in Comparative Example 4 were carried out to prepare a 463450 prism-shaped non-aqueous secondary battery.

Comparative Example 18

As a positive electrode active material, the same mixture as used in Example 10 was used in place of $LiNi_{0.6}Co_{0.2}Mn_{0.2}O_2$. Except for the change noted here, the same processes as used in Comparative Example 5 were carried out to prepare a 463450 prism-shaped non-aqueous secondary battery.

Comparative Example 19

As a positive electrode active material, the same mixture as used in Example 10 was used in place of $LiNi_{0.6}Co_{0.2}Mn_{0.2}O_2$. Except for the change noted here, the same processes as used in Comparative Example 6 were carried out to prepare a 463450 prism-shaped non-aqueous secondary battery.

Comparative Example 20

As a positive electrode active material, the same mixture as used in Example 10 was used in place of $LiNi_{0.6}Co_{0.2}Mn_{0.2}O_2$. Except for the change noted here, the same processes as used in Comparative Example 7 were carried out to prepare a 463450 prism-shaped non-aqueous secondary battery.

Comparative Example 21

As a positive electrode active material, the same mixture as used in Example 10 was used in place of $LiNi_{0.6}Co_{0.2}Mn_{0.2}O_2$. Except for the change noted here, the same processes as used in Comparative Example 8 were carried out to prepare a 463450 prism-shaped non-aqueous secondary battery.

Comparative Example 22

As a positive electrode active material, the same mixture as used in Example 10 was used in place of $LiNi_{0.6}Co_{0.2}Mn_{0.2}O_2$. Except for the change noted here, the same processes as used in Comparative Example 9 were carried out to prepare a 463450 prism-shaped non-aqueous secondary battery.

Comparative Example 23

As a positive electrode active material, the same mixture as used in Example 10 was used in place of $LiNi_{0.6}Co_{0.2}Mn_{0.2}O_2$. Except for the change noted here, the same processes as used in Comparative Example 10 were carried out to prepare a 463450 prism-shaped non-aqueous secondary battery.

Comparative Example 24

As a positive electrode active material, the same mixture as used in Example 10 was used in place of $LiNi_{0.6}Co_{0.2}Mn_{0.2}O_2$. Except for the change noted here, the same processes as used in Comparative Example 11 were carried out to prepare a 463450 prism-shaped non-aqueous secondary battery.

Comparative Example 25

As a positive electrode active material, the same mixture as used in Example 10 was used in place of $LiNi_{0.6}Co_{0.2}Mn_{0.2}O_2$. Except for the change noted here, the same processes as used in Comparative Example 12 were carried out to prepare a 463450 prism-shaped non-aqueous secondary battery.

Comparative Example 26

As a positive electrode active material, the same mixture as used in Example 10 was used in place of $LiNi_{0.6}Co_{0.2}Mn_{0.2}O_2$. Except for the change noted here, the same processes as used in Comparative Example 13 were carried out to prepare a 463450 prism-shaped non-aqueous secondary battery.

Example 19

$Li_{1.0}Ni_{0.5}Co_{0.2}Mn_{0.3}O_2$ and $LiCoO_2$ were weighed at a mass ratio of 1:9. These were mixed for 30 minutes with a HENSCHEL mixer to obtain a mixture. As a positive electrode active material, the mixture as obtained above was used in place of $LiNi_{0.6}Co_{0.2}Mn_{0.2}O_2$. Except for the change noted here, the same processes as used in Example 1 were carried out to prepare a 463450 prism-shaped non-aqueous secondary battery.

Example 20

As a positive electrode active material, the mixture as used in Example 19 was used in place of $LiNi_{0.6}Co_{0.2}Mn_{0.2}O_2$. Except for the change noted here, the same processes as used in Example 2 were carried out to prepare a 463450 prism-shaped non-aqueous secondary battery.

Example 21

As a positive electrode active material, the mixture as used in Example 19 was used in place of $LiNi_{0.6}Co_{0.2}Mn_{0.2}O_2$. Except for the change noted here, the same processes as used in Example 3 were carried out to prepare a 463450 prism-shaped non-aqueous secondary battery.

Example 22

As a positive electrode active material, the mixture as used in Example 19 was used in place of $LiNi_{0.6}Co_{0.2}Mn_{0.2}O_2$. Except for the change noted here, the same processes as used in Example 4 were carried out to prepare a 463450 prism-shaped non-aqueous secondary battery.

Example 23

As a positive electrode active material, the mixture as used in Example 19 was used in place of $LiNi_{0.6}Co_{0.2}Mn_{0.2}O_2$. Except for the change noted here, the same processes as used in Example 5 were carried out to prepare a 463450 prism-shaped non-aqueous secondary battery.

Example 24

As a positive electrode active material, the mixture as used in Example 19 was used in place of $LiNi_{0.6}Co_{0.2}Mn_{0.2}O_2$. Except for the change noted here, the same processes as used in Example 6 were carried out to prepare a 463450 prism-shaped non-aqueous secondary battery.

Example 25

As a positive electrode active material, the mixture as used in Example 19 was used in place of $LiNi_{0.6}Co_{0.2}Mn_{0.2}O_2$. Except for the change noted here, the same processes as used in Example 7 were carried out to prepare a 463450 prism-shaped non-aqueous secondary battery.

Example 26

As a positive electrode active material, the mixture as used in Example 19 was used in place of $LiNi_{0.6}Co_{0.2}Mn_{0.2}O_2$. Except for the change noted here, the same processes as used in Example 8 were carried out to prepare a 463450 prism-shaped non-aqueous secondary battery.

Example 27

As a positive electrode active material, the mixture as used in Example 19 was used in place of $LiNi_{0.6}Co_{0.2}Mn_{0.2}O_2$. Except for the change noted here, the same processes as used in Example 9 were carried out to prepare a 463450 prism-shaped non-aqueous secondary battery.

Comparative Example 27

As a positive electrode active material, the mixture as used in Example 19 was used in place of $LiNi_{0.6}Co_{0.2}Mn_{0.2}O_2$. Except for the change noted here, the same processes as used in Comparative Example 1 were carried out to prepare a 463450 prism-shaped non-aqueous secondary battery.

Comparative Example 28

As a positive electrode active material, the mixture as used in Example 19 was used in place of $LiNi_{0.6}Co_{0.2}Mn_{0.2}O_2$. Except for the change noted here, the same processes as used in Comparative Example 2 were carried out to prepare a 463450 prism-shaped non-aqueous secondary battery.

Comparative Example 29

As a positive electrode active material, the mixture as used in Example 19 was used in place of $LiNi_{0.6}Co_{0.2}Mn_{0.2}O_2$. Except for the change noted here, the same processes as used in Comparative Example 3 were carried out to prepare a 463450 prism-shaped non-aqueous secondary battery.

Comparative Example 30

As a positive electrode active material, the mixture as used in Example 19 was used in place of $LiNi_{0.6}Co_{0.2}Mn_{0.2}O_2$. Except for the change noted here, the same processes as used in Comparative Example 4 were carried out to prepare a 463450 prism-shaped non-aqueous secondary battery.

Comparative Example 31

As a positive electrode active material, the mixture as used in Example 19 was used in place of $LiNi_{0.6}Co_{0.2}Mn_{0.2}O_2$. Except for the change noted here, the same processes as used in Comparative Example 5 were carried out to prepare a 463450 prism-shaped non-aqueous secondary battery.

Comparative Example 32

As a positive electrode active material, the mixture as used in Example 19 was used in place of $LiNi_{0.6}Co_{0.2}Mn_{0.2}O_2$. Except for the change noted here, the same processes as used in Comparative Example 6 were carried out to prepare a 463450 prism-shaped non-aqueous secondary battery.

Comparative Example 33

As a positive electrode active material, the mixture as used in Example 19 was used in place of $LiNi_{0.6}Co_{0.2}Mn_{0.2}O_2$. Except for the change noted here, the same processes as used in Comparative Example 7 were carried out to prepare a 463450 prism-shaped non-aqueous secondary battery.

Comparative Example 34

As a positive electrode active material, the mixture as used in Example 19 was used in place of $LiNi_{0.6}Co_{0.2}Mn_{0.2}O_2$. Except for the change noted here, the same processes as used in Comparative Example 8 were carried out to prepare a 463450 prism-shaped non-aqueous secondary battery.

Comparative Example 35

As a positive electrode active material, the mixture as used in Example 19 was used in place of $LiNi_{0.6}Co_{0.2}Mn_{0.2}O_2$. Except for the change noted here, the same processes as used in Comparative Example 9 were carried out to prepare a 463450 prism-shaped non-aqueous secondary battery.

Comparative Example 36

As a positive electrode active material, the mixture as used in Example 19 was used in place of $LiNi_{0.6}Co_{0.2}Mn_{0.2}O_2$. Except for the change noted here, the same processes as used in Comparative Example 10 were carried out to prepare a 463450 prism-shaped non-aqueous secondary battery.

Comparative Example 37

As a positive electrode active material, the mixture as used in Example 19 was used in place of $LiNi_{0.6}Co_{0.2}Mn_{0.2}O_2$. Except for the change noted here, the same processes as used in Comparative Example 11 were carried out to prepare a 463450 prism-shaped non-aqueous secondary battery.

Comparative Example 38

As a positive electrode active material, the mixture as used in Example 19 was used in place of $LiNi_{0.6}Co_{0.2}Mn_{0.2}O_2$. Except for the change noted here, the same processes as used in Comparative Example 12 were carried out to prepare a 463450 prism-shaped non-aqueous secondary battery.

Comparative Example 39

As a positive electrode active material, the mixture as used in Example 19 was used in place of $LiNi_{0.6}Co_{0.2}Mn_{0.2}O_2$. Except for the change noted here, the same processes as used in Comparative Example 13 were carried out to prepare a 463450 prism-shaped non-aqueous secondary battery.

With respect to the negative electrodes for battery according to each of the Examples and the Comparative Examples, Tables 1 and Table 2 show the following results: an average particle diameter dg of graphite; an average particle diameter ds of the SiO; a ds/dg value; a crystallite diameter of Si in the SiO; an SiO ratio in the composite of SiO and carbon material; and a graphite ratio in the total of the composite of SiO and carbon material, and the graphite. In Table 1, the results of "crystallite diameter of Si in the SiO" are referred to as "crystallite diameter of Si. The results of "SiO ratio in the composite of SiO and carbon material" (i.e., the ratio of SiO in the total of the SiO and the carbon material) are referred to as "SiO ratio in the composite." The results of "graphite ratio in the total of the composite of SiO and carbon material, and the graphite" are referred to as "graphite ratio."

TABLE 1

|  | dg (μm) | ds (μm) | ds/dg | Si crystallite diameter (nm) | SiO ratio in the composite (mass %) | Graphite ratio (mass %) |
|---|---|---|---|---|---|---|
| Ex. 1, Ex. 10, Ex. 19 | 20 | 1 | 0.05 | 40 | 70 | 85 |
| Ex. 2, Ex. 11, Ex. 20 | 4 | 1 | 0.25 | 40 | 70 | 85 |

TABLE 1-continued

|  | dg (μm) | ds (μm) | ds/dg | Si crystallite diameter (nm) | SiO ratio in the composite (mass %) | Graphite ratio (mass %) |
|---|---|---|---|---|---|---|
| Ex. 3, Ex. 12, Ex. 21 | 10 | 10 | 1 | 40 | 70 | 85 |
| Ex. 4, Ex. 13, Ex. 22 | 10 | 1 | 0.1 | 40 | 70 | 85 |
| Ex. 5, Ex. 14, Ex. 23 | 10 | 1 | 0.1 | 40 | 95 | 85 |
| Ex. 6, Ex. 15, Ex. 24 | 20 | 1 | 0.05 | 40 | 70 | 70 |
| Ex. 7, Ex. 16, Ex. 25 | 4 | 1 | 0.25 | 40 | 70 | 70 |
| Ex. 8, Ex. 17, Ex. 26 | 20 | 1 | 0.05 | 40 | 70 | 60 |
| Ex. 9, Ex. 18, Ex. 27 | 4 | 1 | 0.25 | 40 | 70 | 60 |

TABLE 2

|  | dg (μm) | ds (μm) | ds/dg | Si crystallite diameter (nm) | SiO ratio in the composite (mass %) | Graphite ratio (mass %) |
|---|---|---|---|---|---|---|
| Comp. Ex. 1, Comp. Ex. 14, Comp. Ex. 27 | 25 | 2 | 0.08 | 40 | 70 | 85 |
| Comp. Ex. 2, Comp. Ex. 15, Comp. Ex. 28 | 2 | 1 | 0.5 | 40 | 70 | 85 |
| Comp. Ex. 3, Comp. Ex. 16, Comp. Ex. 29 | 10 | 13 | 1.3 | 40 | 70 | 85 |
| Comp. Ex. 4, Comp. Ex. 17, Comp. Ex. 30 | 10 | 0.4 | 0.04 | 40 | 70 | 85 |
| Comp. Ex. 5, Comp. Ex. 18, Comp. Ex. 31 | 10 | 1 | 0.1 | 40 | 98 | 85 |
| Comp. Ex. 6, Comp. Ex. 19, Comp. Ex. 32 | 10 | 1 | 0.1 | 40 | 50 | 85 |
| Comp. Ex. 7, Comp. Ex. 20, Comp. Ex. 33 | 10 | 1 | 0.1 | 60 | 70 | 85 |
| Comp. Ex. 8, Comp. Ex. 21, Comp. Ex. 34 | 25 | 2 | 0.08 | 40 | 70 | 70 |
| Comp. Ex. 9, Comp. Ex. 22, Comp. Ex. 35 | 4 | 5 | 1.25 | 40 | 70 | 70 |
| Comp. Ex. 10, Comp. Ex. 23, Comp. Ex. 36 | 2 | 1 | 0.5 | 40 | 70 | 70 |
| Comp. Ex. 11, Comp. Ex. 24, Comp. Ex. 37 | 25 | 2 | 0.08 | 40 | 70 | 60 |
| Comp. Ex. 12, Comp. Ex. 25, Comp. Ex. 38 | 4 | 5 | 1.25 | 40 | 70 | 60 |
| Comp. Ex. 13, Comp. Ex. 26, Comp. Ex. 39 | 2 | 1 | 0.5 | 40 | 70 | 60 |

The batteries according to each of the Examples and the Comparative Examples were applied to the test of the charge discharge cycle characteristics and the measurement of the thickness change in the negative electrodes, as follows.

Charge Discharge Cycle Characteristic Test

Each battery was applied to a constant current-constant voltage charge at a constant current of 1 C and a constant voltage of 4.2V (note that it was at 4.35V for Examples 19 to 27 and Comparative Example 27 to 39) for a total charge time of 3 hours. Then, it was applied to a constant current discharge at 1 C (the discharge stop voltage: 2.7V) to measure a discharge capacity (mAh). These processes were assumed to be one cycle. 500 cycles of the charge and the discharge were repeated on the same condition. Then, a capacity retention rate was calculated: (the discharge capacity at the 500th cycle)/(the discharge capacity at the $1^{st}$ cycle)×100%.

It is noted that the batteries of Examples 1 to 5, 10 to 14 and 19 to 23, and Comparative Examples 1 to 7, 14 to 20 and 27 to 33 were applied to the condition changing from 1 C to 900 mA. The batteries of Examples 6, 7, 15, 16, 24 and 25, and Comparative Example 8 to 10, 21 to 23 and 34 to 36 were applied to the condition changing from 1 C to 960 mA. The batteries of Examples 8, 9, 17, 18, 26 and 27, and Comparative Examples 11 to 13, 24 to 26 and 37 to 39 were applied to the condition changing from 1 C to 1040 mA.

Measurement of Thickness Change of Negative Electrode

Each battery as described above (note that each battery here has not applied to the charge discharge cycle characteristic test) was applied to the charge and the discharge on the same condition as used in the charge discharge cycle characteristic test. The charge was stopped when completing the second cycle. At the moment, the battery was disassembled within a glove box with an argon gas substituted, thereby taking out the negative electrode. The thickness was measured. Then, calculated was the amount of the thickness change of the negative electrode before and after using it inside the battery.

Tables 3 to 8 show the results of the evaluations as described before.

TABLE 3

| | Initial discharge capacity (mAh) | Discharge capacity at the $500^{th}$ cycle (mAh) | capacity retention rate at the $500^{th}$ cycle (%) | Thickness change of the negative electrode (μm) |
|---|---|---|---|---|
| Ex. 1 | 899 | 746 | 83 | 7 |
| Ex. 2 | 894 | 751 | 84 | 9 |
| Ex. 3 | 897 | 736 | 82 | 10 |
| Ex. 4 | 900 | 765 | 85 | 8 |
| Ex. 5 | 908 | 735 | 81 | 10 |
| Ex. 6 | 961 | 769 | 80 | 10 |
| Ex. 7 | 958 | 776 | 81 | 10 |
| Ex. 8 | 1038 | 654 | 63 | 13 |
| Ex. 9 | 1037 | 674 | 65 | 13 |

TABLE 4

| | Initial discharge capacity (mAh) | Discharge capacity at the $500^{th}$ cycle (mAh) | capacity retention rate at the $500^{th}$ cycle (%) | Thickness change of the negative electrode (μm) |
|---|---|---|---|---|
| Comp. Ex. 1 | 896 | 636 | 71 | 7 |
| Comp. Ex. 2 | 805 | 668 | 83 | 10 |
| Comp. Ex. 3 | 897 | 484 | 54 | 19 |
| Comp. Ex. 4 | 808 | 671 | 83 | 10 |
| Comp. Ex. 5 | 912 | 575 | 63 | 16 |
| Comp. Ex. 6 | 774 | 658 | 85 | 8 |
| Comp. Ex. 7 | 750 | 495 | 66 | 7 |
| Comp. Ex. 8 | 960 | 624 | 65 | 11 |

TABLE 4-continued

| | Initial discharge capacity (mAh) | Discharge capacity at the $500^{th}$ cycle (mAh) | capacity retention rate at the $500^{th}$ cycle (%) | Thickness change of the negative electrode (μm) |
|---|---|---|---|---|
| Comp. Ex. 9 | 957 | 517 | 54 | 16 |
| Comp. Ex. 10 | 899 | 638 | 71 | 14 |
| Comp. Ex. 11 | 1037 | 456 | 44 | 15 |
| Comp. Ex. 12 | 1041 | 344 | 33 | 25 |
| Comp. Ex. 13 | 998 | 489 | 49 | 20 |

TABLE 5

| | Initial discharge capacity (mAh) | Discharge capacity at the $500^{th}$ cycle (mAh) | capacity retention rate at the $500^{th}$ cycle (%) | Thickness change of the negative electrode (μm) |
|---|---|---|---|---|
| Ex. 10 | 897 | 753 | 84 | 7 |
| Ex. 11 | 891 | 748 | 84 | 8 |
| Ex. 12 | 895 | 734 | 82 | 9 |
| Ex. 13 | 897 | 753 | 84 | 8 |
| Ex. 14 | 903 | 740 | 82 | 9 |
| Ex. 15 | 960 | 778 | 81 | 10 |
| Ex. 16 | 956 | 765 | 80 | 10 |
| Ex. 17 | 1036 | 642 | 62 | 13 |
| Ex. 18 | 1035 | 662 | 64 | 12 |

TABLE 6

| | Initial discharge capacity (mAh) | Discharge capacity at the $500^{th}$ cycle (mAh) | capacity retention rate at the $500^{th}$ cycle (%) | Thickness change of the negative electrode (μm) |
|---|---|---|---|---|
| Comp. Ex. 14 | 893 | 652 | 73 | 7 |
| Comp. Ex. 15 | 802 | 674 | 84 | 9 |
| Comp. Ex. 16 | 894 | 483 | 54 | 17 |
| Comp. Ex. 17 | 806 | 661 | 82 | 9 |
| Comp. Ex. 18 | 911 | 565 | 62 | 16 |
| Comp. Ex. 19 | 772 | 648 | 84 | 7 |
| Comp. Ex. 20 | 746 | 507 | 68 | 7 |
| Comp. Ex. 21 | 959 | 633 | 66 | 11 |
| Comp. Ex. 22 | 952 | 543 | 57 | 15 |
| Comp. Ex. 23 | 900 | 648 | 72 | 13 |
| Comp. Ex. 24 | 1034 | 496 | 48 | 13 |
| Comp. Ex. 25 | 1043 | 375 | 36 | 23 |
| Comp. Ex. 26 | 998 | 499 | 50 | 19 |

TABLE 7

| | Initial discharge capacity (mAh) | Discharge capacity at the $500^{th}$ cycle (mAh) | capacity retention rate at the $500^{th}$ cycle (%) | Thickness change of the negative electrode (μm) |
|---|---|---|---|---|
| Ex. 19 | 903 | 739 | 82 | 7 |
| Ex. 20 | 897 | 745 | 83 | 10 |
| Ex. 21 | 900 | 719 | 80 | 10 |
| Ex. 22 | 903 | 759 | 84 | 9 |
| Ex. 23 | 913 | 730 | 80 | 9 |
| Ex. 24 | 965 | 770 | 80 | 9 |
| Ex. 25 | 960 | 778 | 81 | 10 |
| Ex. 26 | 1042 | 634 | 61 | 14 |
| Ex. 27 | 1042 | 665 | 64 | 14 |

TABLE 8

|  | Initial discharge capacity (mAh) | Discharge capacity at the 500th cycle (mAh) | capacity retention rate at the 500th cycle (%) | Thickness change of the negative electrode (μm) |
|---|---|---|---|---|
| Comp. Ex. 27 | 900 | 629 | 70 | 8 |
| Comp. Ex. 28 | 808 | 654 | 81 | 12 |
| Comp. Ex. 29 | 902 | 468 | 52 | 20 |
| Comp. Ex. 30 | 812 | 656 | 81 | 12 |
| Comp. Ex. 31 | 916 | 566 | 62 | 18 |
| Comp. Ex. 32 | 777 | 644 | 83 | 8 |
| Comp. Ex. 33 | 753 | 467 | 62 | 8 |
| Comp. Ex. 34 | 965 | 625 | 65 | 13 |
| Comp. Ex. 35 | 961 | 500 | 52 | 18 |
| Comp. Ex. 36 | 902 | 620 | 69 | 16 |
| Comp. Ex. 37 | 1042 | 447 | 43 | 16 |
| Comp. Ex. 38 | 1042 | 312 | 30 | 28 |
| Comp. Ex. 39 | 1000 | 439 | 44 | 22 |

As shown in Tables 3 to 8, the batteries of Examples 1 to 5, 10 to 14 and 19 to 23 had appropriate features in the negative electrode with respect to the average particle diameter dg of graphite, the ds/dg value, the crystallite diameter of Si in the SiO, and the ratio of SiO in the composite of and SiO and carbon material. Therefore, the batteries of Examples 1 to 5, 10 to 14 and 19 to 23 had a high capacity, and a high capacity retention rate at the 500th cycle, as well as excellent charge discharge cycle characteristics. Also, the thickness change in the negative electrode was so small that the battery swelling during the charge and the discharge could be suppressed.

By contrast, the batteries of Comparative Example 1, 14 and 27 included negative electrodes containing graphite with a large value of dg. The batteries of Comparative Example 1, 14 and 27 was inferior in view of the load characteristics, and had a low capacity retention rate at the 500th cycle, as well as inferior in view of the charge discharge cycle characteristics. The batteries of Comparative Example 2, 15 and 28 included negative electrodes containing graphite with a small value of dg. The batteries of Comparative Example 2, 15 and 28 had a large irreversible capacity, thereby having a small initial discharge capacity.

The batteries of Comparative Examples 3, 16 and 29 included negative electrodes with a large value of ds/dg. The batteries of Comparative Examples 3, 16 and 29 had a large thickness change in the negative electrode, and a low capacity retention rate at the 500th cycle, as well as inferior charge discharge cycle characteristics. The batteries of Comparative Examples 4, 17 and 30 included negative electrodes containing SiO (composite of SiO and carbon material) with a low value of ds, and a low value of ds/dg. The batteries of Comparative Examples 4, 17 and 30 had a large irreversible capacity, thereby having a low initial discharge capacity.

Each battery of Comparative Examples 5, 18 and 31 included a negative electrode containing a composite of SiO and carbon material with a large SiO ratio. Each battery of these had a low conductibility since the SiO was not sufficiently coated with the carbon material. Each battery had a low capacity retention rate at the 500th cycle, and was inferior in view of the charge discharge cycle characteristics. Each battery of Comparative Examples 6, 19 and 32 included a negative electrode containing a composite of SiO and carbon material with a low SiO ratio. Each battery of these had a low initial discharge capacity. Each battery of Comparative Examples 7, 20 and 33 had a negative electrode containing SiO (composite of SiO and carbon material) with a large Si crystallite diameter. Each battery of these had deteriorated SiO due to the Si volumetric expansion associated with the charge and the discharge, and thereby having a low capacity retention rate of the 500th cycle, and inferior charge discharge cycle characteristics.

Also, each battery of Examples 6, 7, 15, 16, 24, and 25 included a negative electrode with a graphite ratio of 70 mass %. Each battery of Examples 6, 7, 15, 16, 24, and 25 had a higher capacity than that of Examples 1 to 5, 10 to 14 and 19 to 23. Each battery of these had a high capacity retention rate of the 500th cycle, and excellent charge discharge cycle characteristics, as well as a low thickness change in the negative electrode.

By contrast, each battery of Comparative Example 8, 21 and 34 included a negative electrode containing graphite with a large value of dg. Each battery of Comparative Example 8, 21 and 34 had inferior in view of the load characteristics, and had a low capacity retention rate at the 500th cycle as well as inferior charge discharge cycle characteristics. Each battery of Comparative Examples 9, 22 and 35 included a negative electrode with a large ds/dg value. Each battery of Comparative Examples 9, 22 and 35 had a large thickness change in the negative electrode, and a low capacity retention rate at the 500th cycle, as well as inferior charge discharge cycle characteristics. Each battery of Comparative Example 10, 23 and 36 included a negative electrode containing graphite with a small value of dg. Each battery of Comparative Example 10, 23 and 36 had a large irreversible capacity and thereby lowering the initial discharge capacity, and having a low capacity retention rate of the 500th cycle.

Also, each battery of all the Examples had an initial discharge capacity of about 900 mAh or more. Furthermore, the charge discharge cycle characteristics were excellent. From these results, a higher capacity of 650 mAh or more could be secured even after the 500 cycles. By contrast, each battery of the Comparative Examples had a lower capacity after the 500 cycles even though they had had a high initial charge and discharge capacity. As a result, the charge discharge cycle characteristics were inferior to the batteries of the Examples. Among the batteries of the Examples, each battery of Examples 1 to 7, 10 to 16 and 19 to 25 had a negative electrode with a graphite ratio of 70 mass % or more. In particular, each battery of Examples 1 to 7, 10 to 16 and 19 to 25 had a high capacity retention rate of the battery, and a less thickness change in the negative electrode. From these results, it is advantageous to use the graphite ratio in the negative electrode at 70 mass % or more.

INDUSTRIAL APPLICABILITY

The non-aqueous secondary battery of the present invention exhibits various excellent battery characteristics such as charge discharge cycle characteristics. Utilizing these characteristics, it can be used as a power source of small, multifunctional portable equipments. Also, it can be applicable to various usages in which conventional non-aqueous secondary batteries have been applied.

What is claimed is:

1. A negative electrode for non-aqueous secondary battery, comprising:
   a negative electrode active material, comprising
      a composite consisting of $SiO_x$, wherein atom ratio x of O to Si is $0.5 \leq x \leq 1.5$, and a carbon material, and
      graphite, and
   wherein the graphite has an average particle diameter dg (μm) of 4 to 20 μm, wherein the $SiO_x$ has an average particle diameter ds (μm) of 1 μm or more, wherein a ratio ds/dg is 0.05 to 1, wherein the $SiO_x$ has a crystallite diameter of 50 nm or less, the crystallite diameter is obtained from a half width at a (220) plane of Si obtained by an X-ray diffraction method, using Scherrer Formula, wherein in 100 mass % of the composite, a ratio of the $SiO_x$ is 70 to 95 mass %.

2. The negative electrode for non-aqueous secondary battery of claim 1, wherein in 100 mass % of a total of the composite and the graphite, a ratio of the graphite is 70 mass % or more.

3. The negative electrode for non-aqueous secondary battery of claim 1, wherein in the composite, the carbon material has been obtained by thermolysis when heating a hydrocarbon gas in vapor phase.

4. A non-aqueous secondary battery, comprising
a positive electrode comprising a Li-containing transition metal oxide,
a negative electrode, and
a non-aqueous electrolyte,
wherein the negative electrode is the negative electrode for non-aqueous secondary battery of claim 1.

* * * * *